United States Patent [19]
Tazaki et al.
[11] 3,733,550
[45] May 15, 1973

[54] MULTILEVEL SIGNAL TRANSMISSION SYSTEM

[75] Inventors: Kimio Tazaki, Hanakoganei, Kodaira-shi, Tokyo; Hajime Yamamoto, Tokyo; Shigehiko Hinoshita, Yokohama; Shoji Hagiwara, Tokyo, all of Japan

[73] Assignees: Nippon Telegraph & Telephone Public Corporation, Tokyo; Fujitsu Limited, Kawasaki, both of Japan

[22] Filed: Apr. 20, 1972

[21] Appl. No.: 245,949

[30] Foreign Application Priority Data

Apr. 30, 1971 Japan ................................46/29083

[52] U.S. Cl. ................................................325/38 A
[51] Int. Cl. ................................................H04b 1/00
[58] Field of Search ............................325/38 A, 321; 340/146.1, 347 AD, 347 DD; 328/146; 179/15, 55; 178/68

[56] References Cited

UNITED STATES PATENTS 3,590,386 6/1971 Tizi et al..............................325/321
3,622,983 11/1971 Deregnaucourt..................340/146.1
3,666,890 5/1972 Wade..............................179/15 AP
3,701,144 10/1972 Fineran et al.................340/347 AD

*Primary Examiner*—Daryl W. Cook
*Attorney*—Staas, Halsey & Gable

[57] ABSTRACT

Apparatus is disclosed for transmitting a multilevel signal together with at least one pilot signal of specified frequency as a timing signal for determining the sampling position of a transmitted signal and/or a signal for reproducing a demodulating carrier. Further, a reference level signal of a predetermined level is inserted in the multilevel signal train and the pilot signals are inserted in the multilevel signal train after frequency components in the neighborhood of the specified frequencies of the pilot signals are removed from the multilevel signal train on the transmitted side of the transmission line. In processing the multilevel signals the deviation of a sampled transmitted level of the reference level signal from the predetermined level thereof is detected; next, the frequency components in the vicinity of the pilot signals of the specified frequencies removed on the transmitting side of the line are extracted from the deviation; and then the signal distortion of the multilevel signal is corrected with the extracted frequency components on the receiving side on the transmission line.

12 Claims, 13 Drawing Figures

SHEET 2 OF 5

MULTILEVEL SIGNAL TRANSMISSION SYSTEM

BACKGROUND OF THE INVENTION

1. Field of the Invention

This invention relates to multilevel signal transmission systems, and in particular to such systems for correcting distortion of the transmitted signal caused by imposing a pilot signal thereon.

2. Description of the Prior Art

For efficient transmission of a digital signal with the use of a transmission line of relatively high transmission performance, the signal is usually transmitted in the form of a multilevel signal for the reduction of the bandwidth necessary for the transmission. In this case, a transmission pulse is permitted to have one of the predetermined $p$'s amplitude values and this implies that information of $\log_2 P$ bits can be transmitted with one pulse.

The multilevel signal transmission system necessitates correct transmission of the pulse amplitude at the expense of the reduction of the bandwidth necessary for the signal transmission but encounters with many technical difficulties in correct transmission of the pulse amplitude with an increase in the number $p$ of the levels of the multilevel signal.

Generally, in this kind of multilevel signal transmission the received signal is sampled at a correct sampling time and the received level thereby sampled is decoded by a multilevel decoding circuit on the receiving side of the transmission line. To this end, means is adopted on the transmitting side of the line for inserting a timing signal in the multilevel signal to determine a correct sampling position (or time) on the receiving side of the line. Further, in the signal transmission suitable modulation such as for example, residual side band amplitude modulation, is sometimes achieved in accordance with the characteristic of the transmission line. In this particular example, the multilevel signal is transmitted after inserting therein a signal for reproducing a demodulating carrier on the receiving side of the transmission line.

Such a timing signal and a signal for reproducing the demodulating carrier are generally referred to as a pilot signal in this specification. When the frequency spectrum of the multilevel signal to be transmitted exists in the neighborhood of the pilot signal, there is the possibility that when the pilot signal is extracted on the receiving side of the line, the multilevel signal component is mixed in the extracted pilot signal to destroy the purity of the pilot signal, making correct detection of the multilevel signal to be transmitted difficult, if not impossible. To avoid this, in the case of transmitting the multilevel signal together with the pilot signal, it is customary in the art to remove the frequency components of the multilevel signal in the vicinity of that of the pilot signal.

In this case, however, correct extraction of the pilot signal is ensured to take place on the receiving side of the transmission line, but specified frequency components are removed from the multilevel signal to introduce waveform distortion in the multilevel signal due to the removal of the specified frequency components.

Usually, in the case of considering the multilevel signal train in the base band, the signal for reproducing a demodulating carrier is a signal of a component with zero frequency in base band. Therefore, in the case of inserting the pilot signal for reproducing the demodulating carrier, the DC component is removed from the multilevel signal train, so that the zero level of the received multilevel signal on the receiving side is caused to fluctuate due to DC drift. In the case of the timing signal, a component is removed which varies to be of the frequency half the repetitive frequency of the multilevel signal to introduce therein waveform distortion of a cycle about half the repetitive frequency. These fluctuations cause inaccurate decoding of the received multilevel signal level.

SUMMARY OF THE INVENTION

It is therefore an object of this invention to provide a multilevel signal transmission system which utilizes the fact that the removal of the frequency components from the multilevel signal causes a change in the received level of the multilevel signal as above described and in which a reference level signal of a predetermined level is inserted in a multilevel signal to be transmitted to detect a change in the received level of the reference level signal and frequency components in the neighborhood of a pilot signal of a specified frequency removed on the transmitting side are extracted based upon the level change, thereby to correct the aforementioned waveform distortion of the multilevel signal.

It is another object of this invention to provide a multilevel signal transmission system which is adapted such that when a timing signal for determining a correct sampling position or time and/or a signal for reproducing a demodulating carrier are used as pilot signals, waveform distortion resulting from the insertion of the pilot signal is corrected.

It is a still further object of this invention to provide a multilevel signal transmission system in which frequency components in the neighborhood of a pilot signal to be compensated for are prevented from mixing with the waveform of a reference level signal inserted in a multilevel signal train and the cycle of the reference level signal is so selected as to prevent interference of the frequency components in the neighborhood of the pilot signal when sampling at the time of the reference level signal, thereby to ensure compensation for the waveform distortion.

It is a further object of this invention to provide a multilevel signal transmission system which employs novel means for inserting a reference level signal in a multilevel signal with a predetermined period.

It is another object of this invention to provide a multilevel signal transmission system in which when each level of a multilevel signal is represented in a binary number of n's bits, a predetermined level of a reference level signal is selected at the transition point of binary digit in a desired position of the binary number and a level error of the received reference level signal is detected with respect to the binary digit of the selected position.

For attainment of these and other objects, the present invention provides a multilevel signal transmission system of the type transmitting more than one pilot signal of specified frequencies together with a multilevel signal to be transmitted. In particular, on the transmitting side of the transmission line, a reference level signal of a predetermined level is inserted in a multilevel signal and the pilot signals are inserted in the multilevel signal after frequency components adjoining specified frequencies of the pilot signals are removed from the multilevel signal. In processing the transmitted signal, an error between the sampled received level of the reference level signal and its predetermined level is detected; the frequency components adjoining the pilot signals of the specified frequencies removed on the transmitting side are extracted from the detected error, and signal distortion of the multilevel signal is corrected in accordance with the extracted frequency components.

BRIEF DESCRIPTION OF THE DRAWINGS

These and other objects and advantages of the present invention will become more apparent by referring to the following detailed description and accompanying drawings, in which:

FIGS. 4A to 4D are diagrams, explaining variations in the level of the reference level signal when specified frequency components have been removed from the multilevel signal for inserting pilot signals therein;

DESCRIPTION OF THE PREFERRED EMBODIMENTS

Figure 1A:
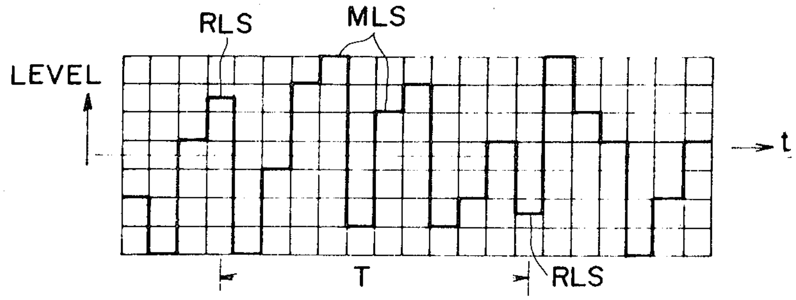
FIGS. 1A and B show multilevel signals to be transmitted in accordance with the present invention, illustrating for example, an octonary signal having a binary reference level signal inserted therein, and the multilevel signal smoothed by a transmission line, respectively.
Figure 1B:
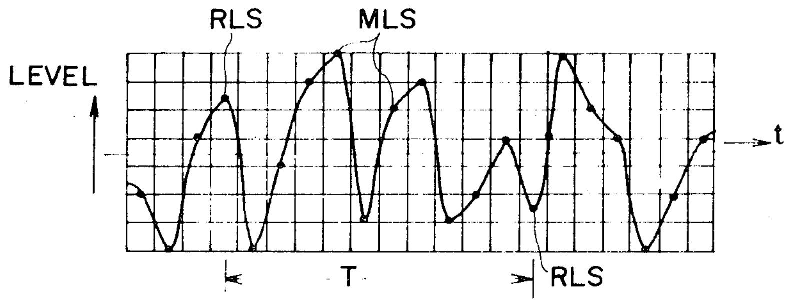

For efficient transmission of a digital signal by the reduction of the bandwidth necessary for transmission, the signal is usually transmitted in the form of a multilevel signal. FIG. 1 illustrates a multilevel signal to be transmitted, for example, an octonary signal with a binary reference level signal inserted therein, the abscissa representing time and the ordinate representing signal amplitude level. RLS indicates the reference level signal and MLS refers to the multilevel signal to be transmitted. Generally, the levels of the multilevel signal MLS to be transmitted are generated at random and the reference level signal RLS having two levels is inserted in the multilevel signal MLS with a predetermined period T. When transmitted through a transmission line, such a waveform as depicted in FIG. 1A becomes smoothed by bandwidth restriction according to the Nyquist theorem, as shown in FIG. 1B. In general, the received waveform is deformed by distortion of the transmission line.

Figure 2:
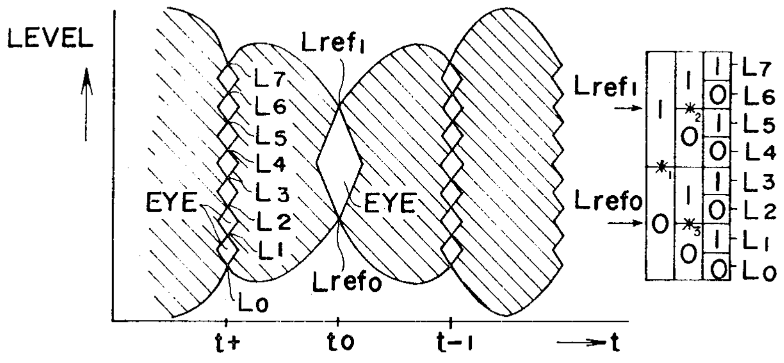
FIG. 2 shows an ideal "eye" pattern for the octonary signal received and, at the same time, the predetermined levels of the reference level signal.

In order to examine the possibility of decoding the levels of the multilevel signal, a figure referred to as an "eye" pattern is prepared. FIG. 2 illustrates an "eye" pattern in an ideal condition when, for example, a binary reference level signal has been inserted in an octonary signal in accordance with the present invention, the abscissa representing time and the ordinate signal amplitude level. In FIG. 2, L0 to L7 indicate the levels of the octonary signal, Lref0 and Lref1 refer to the two levels of the reference level signal, and EYE indicates the "eye" openings of the "eye" pattern. Assuming that the reference level signal RLS is received at a time $t0$, the multilevel signal MLS received at a time $t+1$ or $t-1$ before or after $t0$ may have a desired one of the levels L0 to L7. In an ideal case where the received waveform levels remain unchanged, the levels of the received signal coincide with the levels L0 to L7 at times $t+1$ and $t-1$ and those levels Lref1 and Lref0 at time $t0$, providing in the vicinity of the level points, regions above referred to as "eye" openings EYE where no received waveform exists. The received waveforms lie only in the regions indicated by oblique lines.

The presence of the "eye" openings EYE is indispensable to the decoding of the levels of the transmitted multilevel signal from the received waveforms. Namely, a threshold level is positioned at an intermediate level of each "eye" opening EYE, by which it is judged whether the level of the received waveform is, for example, L0 or L1. On the right of FIG. 2 there is shown the manner of establishment of the levels L0 to L7 and those levels Lref0 and Lref1 of the reference level signal. Namely, when represented in the form of a binary number, the eight levels are (000), (001), (010), (011), (100), (101), (110) and (111), and the levels Lref1 and Lref0 of the reference level signal are selected to be at the transition points of the binary digit in a desired position of the binary number. In the illustrated example, the levels of the reference level signal are selected at points in the central position of the binary number where the binary digit changes from "0" to "1" as indicated by marks "*2" and "*3." This facilitates detection of a level error of the reference level signal as will be described later on.

Generally, in the transmission of such a multilevel signal as above described, a timing signal is added to the multilevel signal on the transmitting side of the transmission line for determining correct sampling positions or times (in FIG. 2, at $t+1$, $t0$ and $t-1$) on the receiving side. Further, in the case of residual side band amplitude modulation for the signal transmission, a signal for reproducing a demodulating carrier is added to the multilevel signal. In this case, when the frequency spectrum of the multilevel signal to be transmitted lies in the neighborhood of the pilot signal, the multilevel signal component gets mixed in the pilot signal extracted on the receiving side to destroy the purity of the pilot signal, providing for deteriorated multilevel signal transmission characteristics. To avoid this, the particular frequency components of the multilevel signal adjoining the pilot signal is removed from the multilevel signal. However, this introduces waveform distortion in the multilevel signal tending to cause an error in the level decoding.

Figure 3:
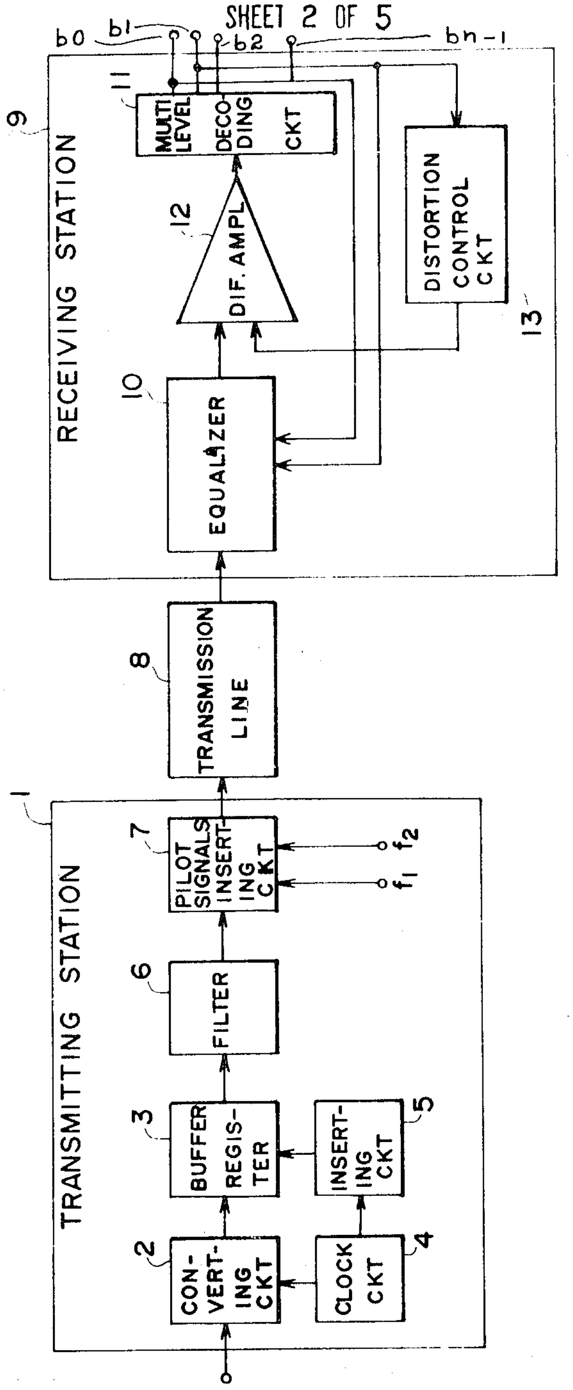
FIG. 3 illustrates in block diagram form the construction of a multilevel signal transmission system in accordance with one illustrative example of this invention.

FIG. 3 illustrates one illustrative example of the multilevel signal transmission system of this invention, in which a reference level signal of a predetermined level is periodically inserted in a multilevel signal to be transmitted and an error caused by the removal of the aforesaid particular frequency components is detected from the level error of the reference level signal on the receiving side of the line and the aforementioned waveform distortion is corrected based upon the detected error.

In FIG. 3, numeral 1 designates a transmitting end station, numeral 2 indicates a binary-multilevel converting circuit for converting a digital signal into a multilevel signal, numeral 3 refers to a buffer register for inserting the reference level signal in the multilevel signal with a predetermined period, numeral 4 identifies a clock circuit, numeral 5 designates a reference level signal insertion control circuit for controlling the buffer register 3, numeral 6 represents a filter for removing frequency components in the neighborhood of pilot signals, numeral 7 indicates a pilot signal inserting circuit for inserting pilot signals of frequencies $f1$ and $f2$, numeral 8 indicates a signal transmission line, numeral 9 refers to a receiving end station, numeral 10 represents a fixed or automatic equalizer, numeral 11 refers to a multilevel decoding circuit, numeral 12 designates a differential amplifier for correcting waveform distortion, numeral 13 refers to a circuit for controlling waveform distortion, and $b0$ to $bn-1$ represent received and decoded output signal in binary number form of $n$'s bits.

In the transmitting end station 1, the binary-multilevel converting circuit 2 converts a digital signal to be transmitted into a multilevel signal under the control of the clock circuit 4. The binary-multilevel converting circuit 2 is a known one and the principle of its operation may be considered such as receiving a plurality of bits representing the levels of the multilevel signal in parallel to produce one analog pulse having corresponding levels. Then, the multilevel pulse signal is written in the buffer register 3 and the reference level signal is inserted in the pulse signal with a predetermined period under the control of the control circuit 5 as described later on, providing such a signal as shown in FIG. 1A. The multilevel signal with the reference level signal inserted therein is fed to the filter 6, by means of which frequency compounds adjoining the pilot signals $f1$ and $f2$ are removed from the multilevel signal. Then, the pilot signal inserting circuit 7 inserts the pilot signals $f1$ and $f2$ in the multilevel signal, after which the multilevel signal is transmitted over the transmission line 8.

Figure 4A:
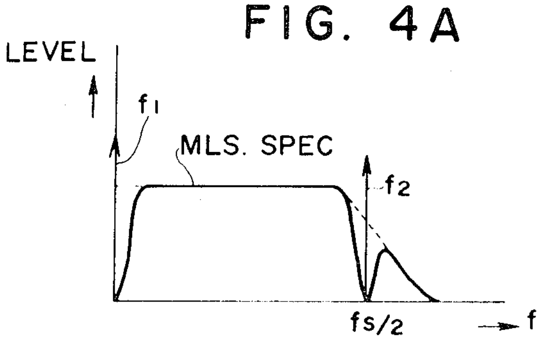

FIG. 4A shows the frequency spectrum of the transmission signal having removed therefrom the particular frequency components by the filter 8 but having inserted therein the pilot signals $f1$ and $f2$. In FIG. 4A, the abscissa represents frequency and the ordinate represents signal level; and $f1$ indicates a pilot signal for reproducing a demodulating signal, $f2$ refers to a pilot signal serving as a timing signal and MLS. Spec. indicates the frequency spectrum of the multilevel signal to be transmitted, from which the frequency components adjoining the pilot signals $f1$ and $f2$ have been removed by the filter 6. Considering the multilevel signal on the basis of the baseband, the frequency of the pilot signal $f1$ for reproducing a demodulating carrier is zero frequency, i.e., the pilot signal coincides with the DC component of the multilevel signal and in the case where the multilevel signal is demodulated, the frequency of the pilot signal coincides with the carrier frequency. The pilot signal $f2$ serving as a timing signal is usually selected to be one-half of the repetitive frequency $fs$ of the multilevel signal. Namely, it is expressed as follows:

$$f_2 = fs/2$$

which is Nyquist frequency.

Referring to FIG. 3, modulation such as for example, residual side band amplitude modulation, is achieved in accordance with the characteristic of the transmission line 8 for efficient transmission of the multilevel signal. Further, there are some occasions when suitable code conversion such as, for example, error correction coding, partial response conversion or the like, is carried out at the transmitting end station 1 for enhancement of code transmission characteristics. Moreover, in order to reduce the necessary bandwidth in the transmission line 8 and to avoid an influence of a noise component in the unnecessary band, the multilevel signal is usually subjected to the so-called Nyquist shaping such that its levels cross one another at right angles at points of integral multiples of its fundamental repetitive cycle.

In general, the signal received in the receiving end station 9 is subjected to intersymbol interference due to linear distortion of the transmission line 8, providing a deteriorated "eye" pattern. The intersymbol interference is equalized by the fixed or automatic equalizer 10. The received signal after equalized is applied to the differential amplifier 12 to correct the aforesaid waveform distortion and then decoded in level by the multilevel decoding circuit 11 to be derived therefrom signals $b0$ to $bn-1$ in the form of binary numbers.

The equalizer 10 shown in FIG. 3 may be fixed for an automatic equalizer, and the automatic equalizer may be such as, for example, that described in BSTJ 1966, Feb., pp255 to 286. In the automatic equalizer 10, the intersymbol interference in the received signal is detected with the polarities of the received signal and a predetermined number of received signals before and after the received signal and the polarity of level deviation of the received signal from its predetermined level, and correction is made by utilizing the detected intersymbol interference in a direction to avoid the intersymbol interference with succeeding signals.

The binary digit of a desired position of the output signal decoded by the multilevel decoding circuit 11 is used for controlling the differential amplifier 12 with the control circuit 13 according to this invention. Assuming that the reference level signal RLS has two levels such as depicted in FIG. 2, when the levels have been positioned at the transition points of binary digit Lref0 and Lref1 in the central position, the binary digit of the central position b1 of the output signal is supplied to the control circuit 13.

FIG. 4 shows the principles of correction of the waveform distortion in accordance with the present invention. As previously described, the frequency components adjoining the pilot signals $f1$ and $f2$ are removed from the frequency spectrum MLS. Spec. of the multilevel signal, as shown in FIG. 4A. The removed component corresponding to the pilot signal $f1$ is a component whose frequency is in the neighborhood of zero, so that DC drift is caused in the received signal. The DC drift is considered to cause a change in the level of the received reference level signal. From an examination of the level fluctuation of the received reference level signal, it will be readily understood that the aforesaid DC drift is detected in a sampled form at the time of sampling the reference level signal. Therefore, a description of the frequency component adjoining the pilot signal $f1$ has been omitted from FIG. 4.

Figure 4B:
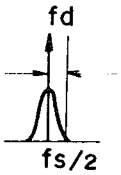

The influence which is exerted on the reference level signal by the removed component corresponding to the pilot signal *f2*, can be considered as follows. Namely, the component removed in FIG. 4A is considered to be such as shown in FIG. 4B which has a bandwidth *fd* about a frequency *fs*/2.

Figure 4C:
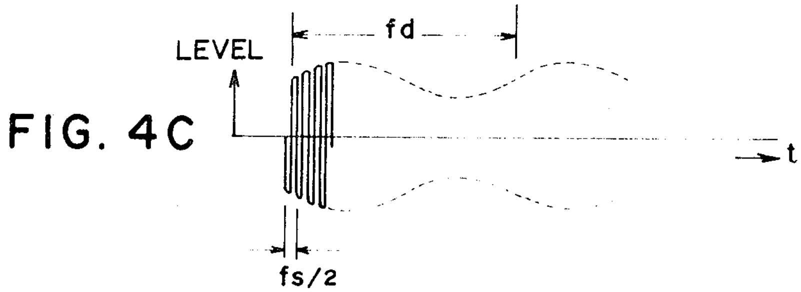

With a graphical representation of the removed component with the abscissa representing time *t*, the removed component can be regarded as a signal having the frequency *fs*/2 and being amplitude-modulated by the frequency *fd* as depicted in FIG. 4C. Accordingly, when the removed bandwidth 2*fd* is much smaller than the repetitive frequency of the reference level signal, it can be presumed that the level of the reference level signal RLS is amplitude-modulated by the frequency *fd* as shown in FIG. 4D and that the amplitude-modulated signals are included in the received reference level signal.

Namely, it will be seen that when the frequency components in the neighborhood of the pilot signals *f1* and *f2* are removed, the level of the received reference level signal RLS is fluctuated correspondingly. In the present invention, the level fluctuation is extracted for correcting similar level fluctuation of succeeding multilevel signals.

Figure 5D:
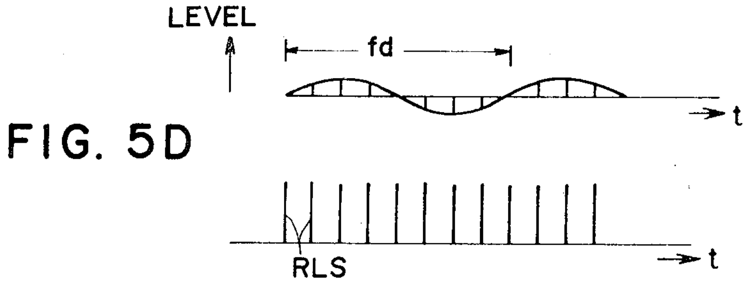
FIGS. 5A and B are diagrams for explaining the insertion of the reference level signal in the multilevel signal on the transmitting side of the transmission line.
Figure 5A:
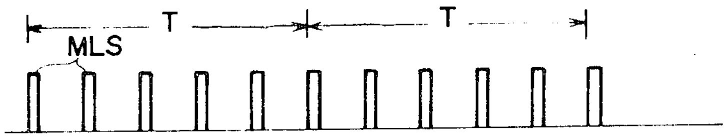

FIGS. 5A and B, and 6 shows the principles of the operation and the detailed construction of the buffer register 3 and the control circuit 5 therefor, shown in FIG. 3. In FIGS. 5 and 6, RLS designates a reference level signal (of two levels, for example,) inserted in a multilevel signal to be transmitted in accordance with the present invention, MLS represents the multilevel signal CKL refers to a clock signal, T designates a desired period of time which is the cycle of the reference level signal, *m* indicates a desired integer, numeral 18 represents an (*m*+1) ring counter, numeral 22 and 16 identify AND gate circuits, numeral 20 designates an AND gate circuit having a NOT input, and numeral 14 refers to an OR gate circuit.

Figure 5B:
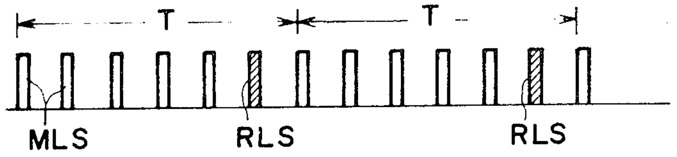
Figure 6:
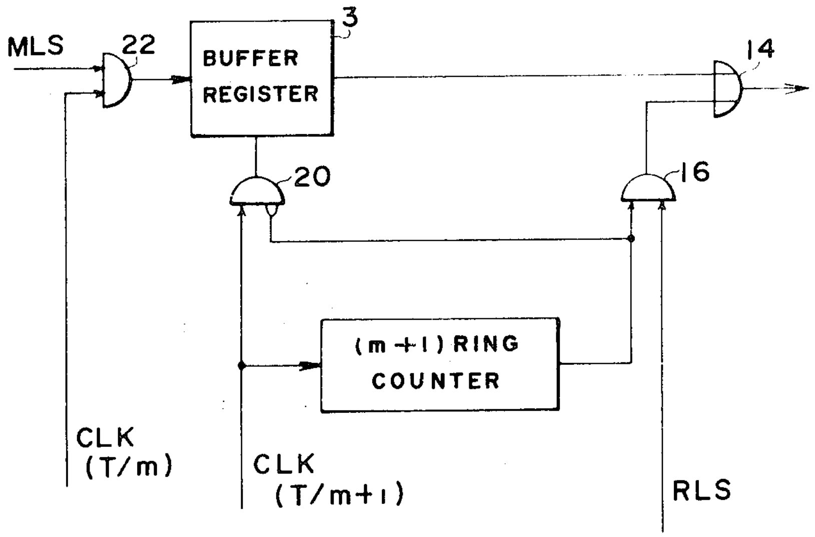
FIG. 6 illustrates a reference level signal inserting circuit for use in system shown in FIG. 3.

As illustrated in FIGS. 5 and 6, the multilevel signal MLS having, for example, eight levels derived from the multilevel decoding circuit 2 shown in FIG. 3 is written in the buffer register 3 through the AND gate circuit 22 with the clock signal CLK (T/*m*) having a repetitive cycle T/*m*. Namely, *m*'s signals MLS are written in the buffer register 3 in the time T. Then, except during carry of the ring counter 18, the *m*'s signals MLS written in the buffer register 3 are read out through an OR gate circuit 14 with a clock signal having a repetitive cycle T/*m*+1 which is derived through the AND gate circuit 20. Consequently, the reading-out of the multilevel signal MLS is interrupted for a period of time T/*m*+1 (during carry of the ring counter RC) once in the time T as shown in FIG. 5B. During such interruption of reading out of the multilevel signal, the binary reference level signal RLS is fed through the AND gate circuit 16 and the OR gate circuit 14.

Figure 7:
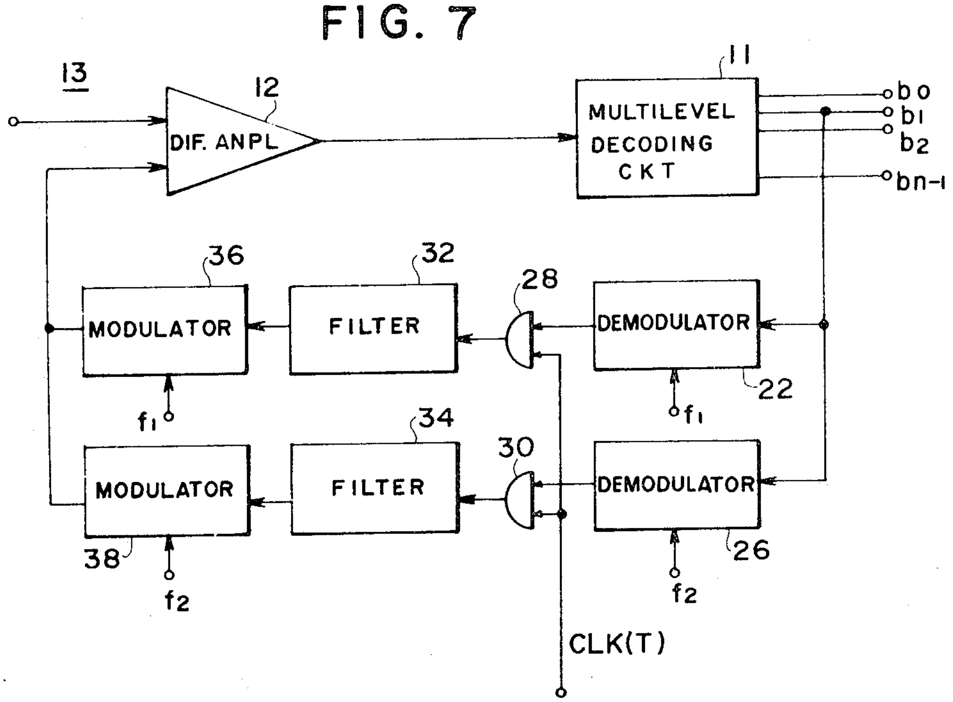
FIG. 7 shows one illustrative example of the circuit construction for correcting waveform distortion on the receiving side of the transmission line, to be incorporated in the system of FIG. 3.

FIG. 7 shows one illustrative example of the circuit construction of this invention for correcting the waveform distortion on the basis of the principles above described in connection with FIGS. 4A to 4D. In FIG. 7, numerals 11 and 12 and *b*0 to *bn*−1 indicate elements and signals similar to those shown in FIG. 3; further, numerals 24 and 26 refer to demodulators of the frequencies *f1* and *f2*, numerals 36 and 38 designate modulators of the frequencies *f1* and *f2*, numerals 32 and 34 identify low-pass filters, and numerals 28 and 30 refer to AND gate circuits which are enabled by a clock signal CLK(T) having the same cycle as the repetitive cycle T of the reference level signal RLS.

Of the binary numbers *b*0 to *bn*−1 of n's bits decoded by the multilevel decoding circuit 11, the signal *b1* is demodulated by the demodulators 24 and 26 at the frequencies *f1* and *f2*. This implies that such frequency components of the signal *b1* adjoining the frequencies *f1* and *f2* as shown in FIG. 4A are demodulated to extract the DC drift (for the frequency *f1*) and to extract the level fluctuation of the signal *b1* caused by the frequency *fd* as depicted in FIG. 4D (for the frequency *f2*). The extracted level fluctuation is supplied by the AND gate circuits 28 and 30 to the low-pass filters 32 and 34 at the time of sampling the reference level signal RLS. This implies that such level fluctuation as depicted in FIG. 4D caused by the frequency *fd* is extracted only in connection with the reference level signal RLS and is filtered in low frequency by the low-pass filters 32 and 34. The filtered signals are converted again by the modulators 36 and 38 into such signals as shown in FIG. 4A which center about the frequencies *f1* and *f2*. These signals are applied from the modulators 36 and 38 to the differential amplifier 12 and used for correcting similar waveform distortion in subsequently received signals. Since the frequency *f1* is a zero frequency, it can be considered that the modulator 36 and the demodulator 24 do not achieve modulating and demodulating operations but only maintain the levels of the signal at suitable values.

Figure 8:
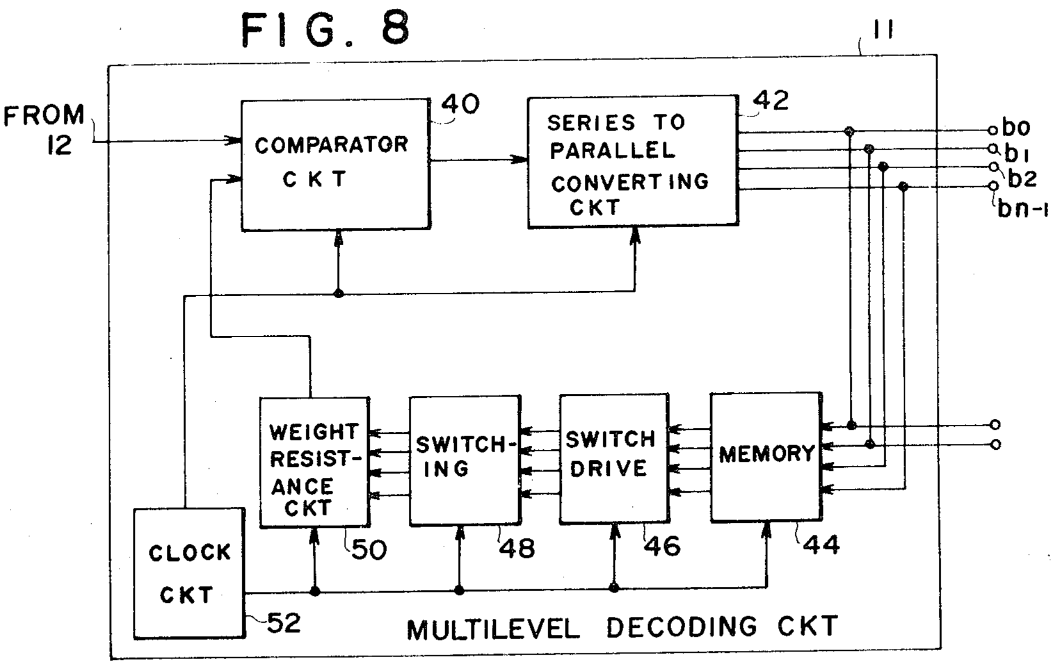
FIG. 8 illustrates one illustrative example of a multilevel decoding circuit depicted in FIGS. 3 and 7.

FIG. 8 illustrates one example of the multilevel decoding circuit 11 depicted in FIG. 7. The numeral 40 indicates a voltage comparator circuit for comparing the level of an input signal and a predetermined level, the numeral 42 identifies a circuit for converting a series binary signal into a parallel one, numeral 44 identifies a memory circuit such as a flip-flop circuit for memorizing the signals *b*0 to *bn*−1, numeral 46 refers to a switch drive circuit for controlling a switching circuit 48 in accordance with the output of the memory circuit 44, numeral 48 designates the switching circuit for supplying a constant current to a weight resistance circuit 50, numeral 50 identifies the weight resistance circuit controlled by the switching circuit 48, and numeral 52 represents a clock circuit.

The multilevel decoding circuit 11 shown in FIG. 8 is a known circuit referred to as a feedback-type coder, the operation of which will be briefly described. The voltage comparator circuit 40 has such voltage standard as depicted in FIG. 2 and its comparison reference point is at first selected at the transdiction point of binary digit of the most significant position as indicated by a mark "*1." When supplied with an input signal, the comparator circuit 40 produces an output "1" or "0" according to whether the level of the input signal lies above or below the comparison reference point "*1." If, now, the input signal level is L5, the output signal "1" is derived from the comparator circuit 40 in the above case. The output signal "1" of the most significant position is fed to the converting circuit 42 to derive therefrom an output signal "1" as a signal *b*0, which is then memorized by the memory circuit 44. The memory circuit 44 controls the weight resistance circuit 50 through the switch drive circuit 46 and the switching circuit 48. As a result of this, the comparison reference point of the voltage comparator circuit 40 is raised by one-half level to be set at the transition point of binary digit in a second position as indicated by a mark "*2" shown in FIG. 2. Then, the input signal of the level L5 is compared with the comparison reference point set as above described to derive an output signal "0" as a signal $b1$. This output signal "0" is memorized by the memory circuit 44 and the comparison reference point of the comparator circuit 40 is lowered by one-half level to be set at a point marked "*4" in FIG. 2 in a manner similar to the above mentioned. Then, the input signal of the level L5 is compared with the comparison reference point to provide an output signal "1" as a signal $b2$.

Since the levels Lref0 and Lref1 of the reference level signal RLS are selected as depicted in FIG. 2, the level fluctuation of the reference level signal RLS can be directly detected by extracting the binary digit of the signal $b1$. Accordingly, the component resulting from the waveform distortion in the level fluctuation of the reference level signal RLS can be directly detected by sampling the fluctuation of the binary digit of the signal $b1$ with the AND gate circuits 28 and 30. This level can be usually selected at the transition point of binary digit of a desired position of the signal $b1$. In this case, the binary digit of the selected position is utilized for the correction of the waveform distortion.

In order that such distortion correction as described in connection with FIG. 7 may be achieved without fail, it is desired that the reference level signal inserted according to this invention satisfies the following conditions.

Namely, it is necessary that the multilevel waveform of the inserted reference level signal itself does not include the frequency components adjoining the pilot signals $f1$ and $f2$ to be compensated and that the repetitive cycle of the reference level signal is selected such that the frequency components adjoining the pilot signals $f1$ and $f2$ do not interfere with each other at the time of sampling the reference level signal.

For example, if the frequency of the pilot signal $f1$ is taken as zero, if the frequency of the pilot signal $f2$ is taken as $fs/2$, if the repetitive frequency of the reference level signal RLS is taken as $fp$, if the repetitive frequency of the pattern due to the level alternation of the reference level signal is taken as $fq$, and if $l$, $k$, $u$ and $v$ are integers respectively, the following equations are obtained:

$$fp = fs/l$$

$$fq = fp/k = fs/l \cdot k$$

In this case, the following conditions must be satisfied:

$$ufp \pm fq = \frac{u}{l} f s \pm \frac{1}{l \cdot k} f_s \neq \frac{f_s}{2} \text{ or } 0 \quad (1)$$

$$ufp = \frac{u}{l} fs \neq \frac{f_s}{2} \quad (2)$$

From the above equations (1) and (2), the following equations are obtained:

$$l \neq 2u;\ l \neq 2u \pm (2/k) \quad (3)$$

This results in that $l$ is an odd number and that $k \neq 2$.

The above equation (1) implies such a condition that any components, which appear when any harmonics of the repetitive frequency $fp$ is modulated by the repetitive frequency $fq$ of the pattern of the reference level signal, do not coincide with the pilot signal $f1 = 0$ or $f2 = fs/2$. The equation (2) implies such a condition that any harmonics of the repetitive frequency $fp$ of the reference level signal RLS do not coincide with the pilot signal $f2 = fs/2$.

In order to satisfy the conditions such as $l$ being an odd number and $k \neq 2$, $l$ is selected to be 129, that is, $fp = fs/129$. In the case where the reference level signal has two levels, it is considered that the levels repeat in such an order as Lref0, Lref0, Lref1, Lref1, Lref0, Lref0, . . . This is a preferred waveform in the case of this invention.

In FIG. 7, there is examplified the circuit construction in which the signal is demodulated by the demodulators 24 and 26, converted into a component in the neighborhood of direct current and sampled by the AND gate circuits 28 and 30 at the time of the reference level signal; an error is extracted by the low-pass filters 32 and 34, and converted by the modulators 36 and 38 into the original frequency components $f1$ and $f2$ and then negatively fed back to the differential amplifier 12. However, the present invention is not restricted specifically to the illustrated example. Namely, it will be apparent that the same results as those described above can also be obtained by providing a bandpass filter of a frequency adjoining the pilot signal $f2$ at a stage following the AND gate circuit 30 instead of employing the demodulator 26, the low-pass filter 34 and the modulator 38 and by directly feeding back the component adjoining the specified frequency $f2$. Further, the same results can also be obtained by reversing the order of the demodulator 26 and the AND gate circuit 30.

It will be seen that signal distortion due to imperfection of the transmission line itself in the neighborhood of the frequencies $f1$ and $f2$ can be removed simultaneously by the present invention. For example, if the frequency $f1$ is a DC frequency, it is also possible to correct distortion which results from cutting off the DC component of the transmission line.

As has been described in the foregoing, based upon the fact that waveform distortion caused by the specified frequency components removed for inserting the pilot signals exerts an influence upon the received level of the reference level signal having the predetermined level, this invention detects the fluctuation included in the level error due to the waveform distortion to correct similar level fluctuation in subsequently received multilevel signals. Accordingly, the present invention makes correct compensation for the components once removed from the multilevel signal to be transmitted, enabling correct multilevel decoding. Since the repetitive frequency and the pattern of the reference level signal are correctly selected, distortion can be corrected without fail.

For inserting the reference level signal RLS in the multilevel signal MLS, the difference between the writing and reading speeds is utilized to provide a vacant time with the predetermined period T, so that the desired purpose can be obtained by relatively simple means. Further, since the levels of the reference level signal RLS is selected to detect the level fluctuation with the binary digit of a desired position of the received signal, the level fluctuation can be detected readily.

Numerous changes may be made in the above described apparatus and the different embodiments of the invention may be made without departing from the spirit thereof; therefore, it is intended that all matter contained in the foregoing description and in the accompanying drawings shall be interpreted as illustrative and not in a limiting sense.

What is claimed is:

1. Apparatus for transmitting a multilevel signal having at least one pilot signal of specified frequency incorporated therein over a transmission line having input and output terminals, said apparatus comprising:

transmission means coupled to the input terminal of the transmission line, said transmission means including reference means for providing a reference level signal of a predetermined level and for inserting the reference level signal in a train of the multilevel signal, means for removing frequency components of the multilevel signal adjoining the specified frequency of the pilot signal, and means for providing and inserting the pilot signal of the specified frequency into the multilevel signal from which the frequency components have been removed; and receiving means coupled to the output terminal of the transmission line, said receiving means including detection means for detecting the error between the level of the transmitted reference level signal and the predetermined level, means for deriving the frequency components adjoing the specified frequency of the pilot signal from the detected error, and correction means for removing signal distortion from the transmitted multilevel signal in response to the derived frequency components.

2. Apparatus as claimed in claim 1, wherein said receiving means includes sampling means for sampling the transmitted multilevel signal at predetermined intervals, and wherein the pilot signal of the specified frequency comprises a timing signal for determining the sampling interval.

3. Apparatus as claimed in claim 2, wherein the timing signal has a frequency of one half the repetitive frequency of the multilevel signal in the multilevel signal train.

4. Apparatus as claimed in claim 1, wherein said transmission means includes means for modulating a multilevel signal to be transmitted, said receiving means includes means for demodulating the transmitted signal, and wherein the pilot signal of the specified frequency comprises a signal for reproducing the demodulating carrier to be applied to said demodulating means for demodulating the transmitted modulated multilevel signals.

5. Apparatus as claimed in claim 4, wherein the pilot signal for reproducing the demodulating carrier is a signal of substantially zero frequency component when the multilevel signal train is considered in the base band.

6. Apparatus as claimed in claim 3, wherein said reference means provides a reference level signal having a frequency of 1/R substantially equal to the repetitive frequency of the multilevel signal in the multilevel signal train, where R is an odd number.

7. Apparatus as claimed in claim 6, wherein said reference means provides a reference level signal having at least first and second levels, and the reference level signal has a pattern repetitive frequency which is not one half the repeated frequency of insertion of the reference level signal into the multilevel signal.

8. Apparatus as calimed in claim 1, wherein said transmission means includes:

storage means clock means for generating a first, repetitive clock signal of intervals of $T/m$ where T is a predetermined interval integer of time and $m$ is a predetermined interger and for generating a second, repetitive clock signal at an interval of $T/(m+1)$;

means responsive to the first clock signal for storing the multilevel signal in said storage means;

means responsive to the second clock signal for retrieving from said storage means a train of the multilevel signal;

means for inserting at the time intervals of T the reference level signal into the train multilevel signals retrieved from said storage means.

9. Apparatus as calimed in claim 8, wherein each level of the multilevel signals to be transmitted is represented by a binary number of n's bits, where n is a predetermined interger, said transmission means including means for providing the level of the reference level signal of a selected magnitude at the transition point of the binary digit of a selected position of the $n$'s bits.

10. Apparatus as claimed in claim 9, wherein said detection means detects the error difference between the level of the transmitted reference level signal and the predetermined level as determined by the binary digit of the selected position.

11. Apparatus as claimed in claim 10, wherein said receiving means includes demodulator means for converting a binary digit component of the selected position of the transmitted multilevel signal train into a signal having a frequency component of substantially zero, extracting means for sampling the demodulated signal with the period T, filter means coupled to said extracting means for removing the high frequency component of the signal derived therefrom, and modulator means for modulating the pilot signal of the specified frequency in accordance with the output signal derived from said filter means, said correction means responsive to the output signal of said modulator means for correcting signal distortion in the transmitted multilevel signal train.

12. Apparatus as claimed in claim 10, wherein said receiving means includes extracting means for sampling at repetitive intervals of the period T, the binary digit of the selected position of the transmitted multilevel signal train, bandpass filter means for removing from the sampled multilevel signal train a frequency band having a center frequency substantially equal to the specified frequency of the pilot signal, said adjustment means responsive to the output signal of said filter means for correcting signal distortion in the transmitted multilevel signal train.

* * * * *